J. W. ALTICK & W. T. WUICHET.
PROCESS FOR REDUCING GARBAGE.
APPLICATION FILED OCT. 11, 1909.
965,271.
Patented July 26, 1910.
4 SHEETS—SHEET 3.
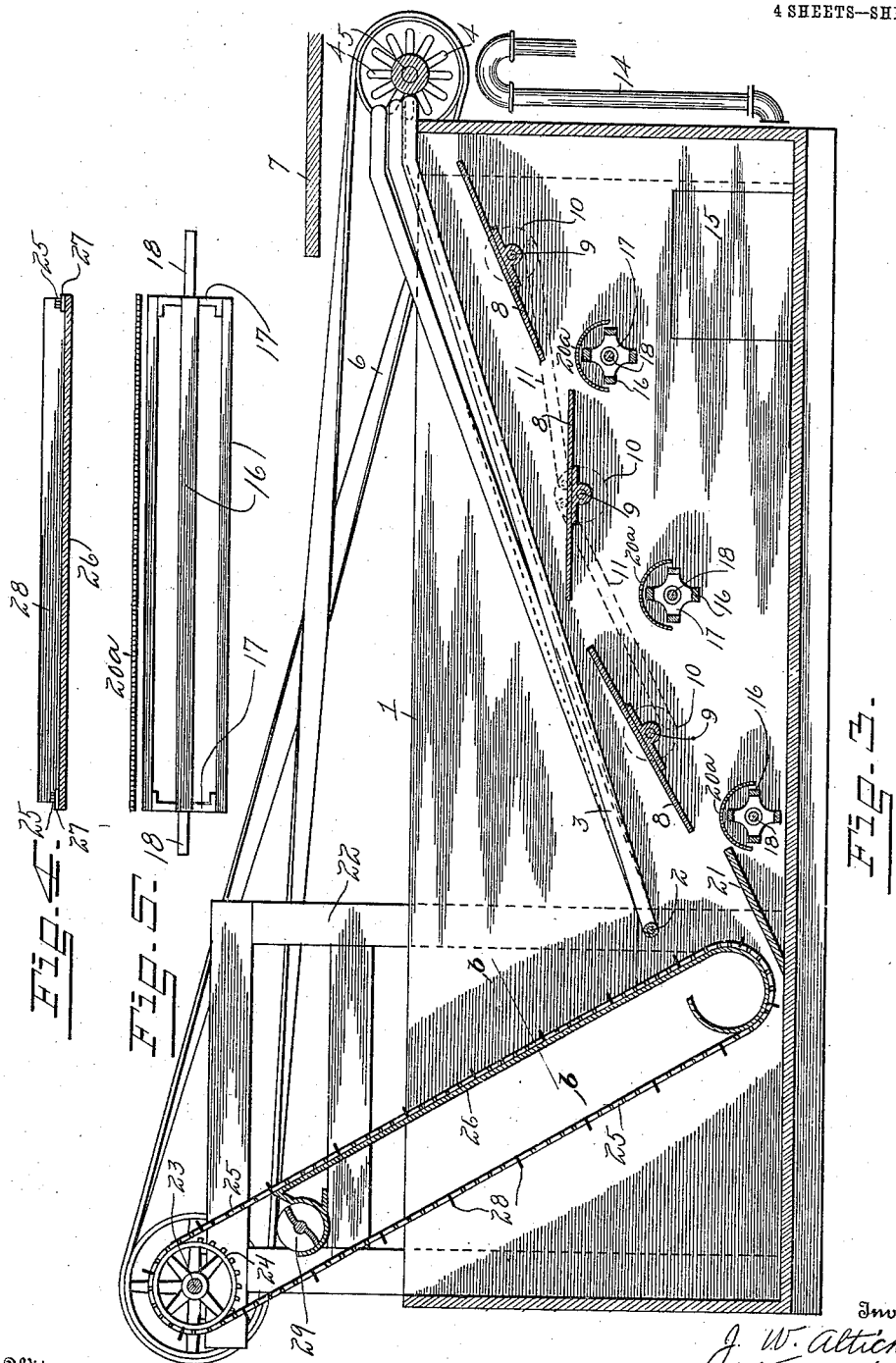

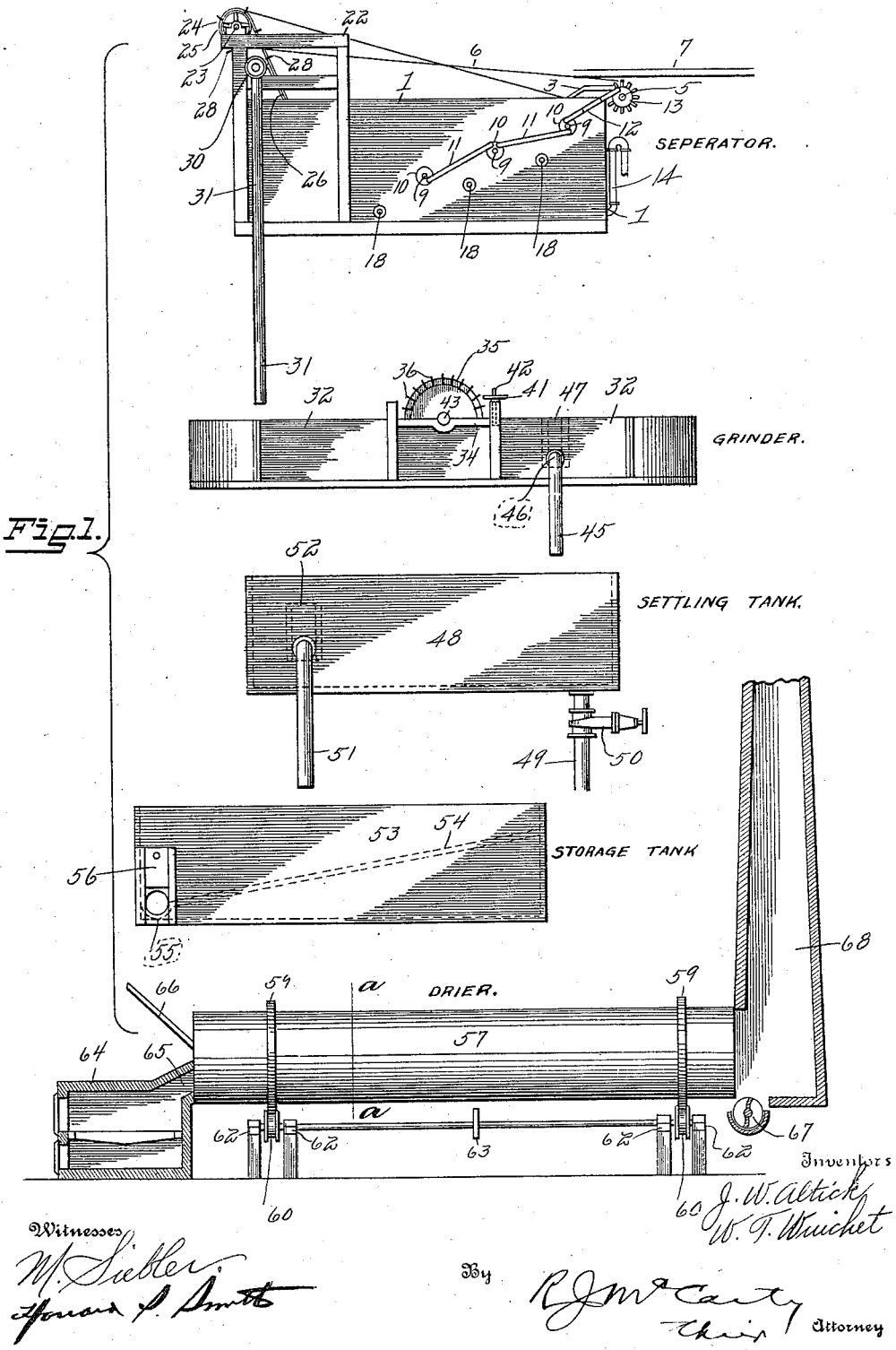

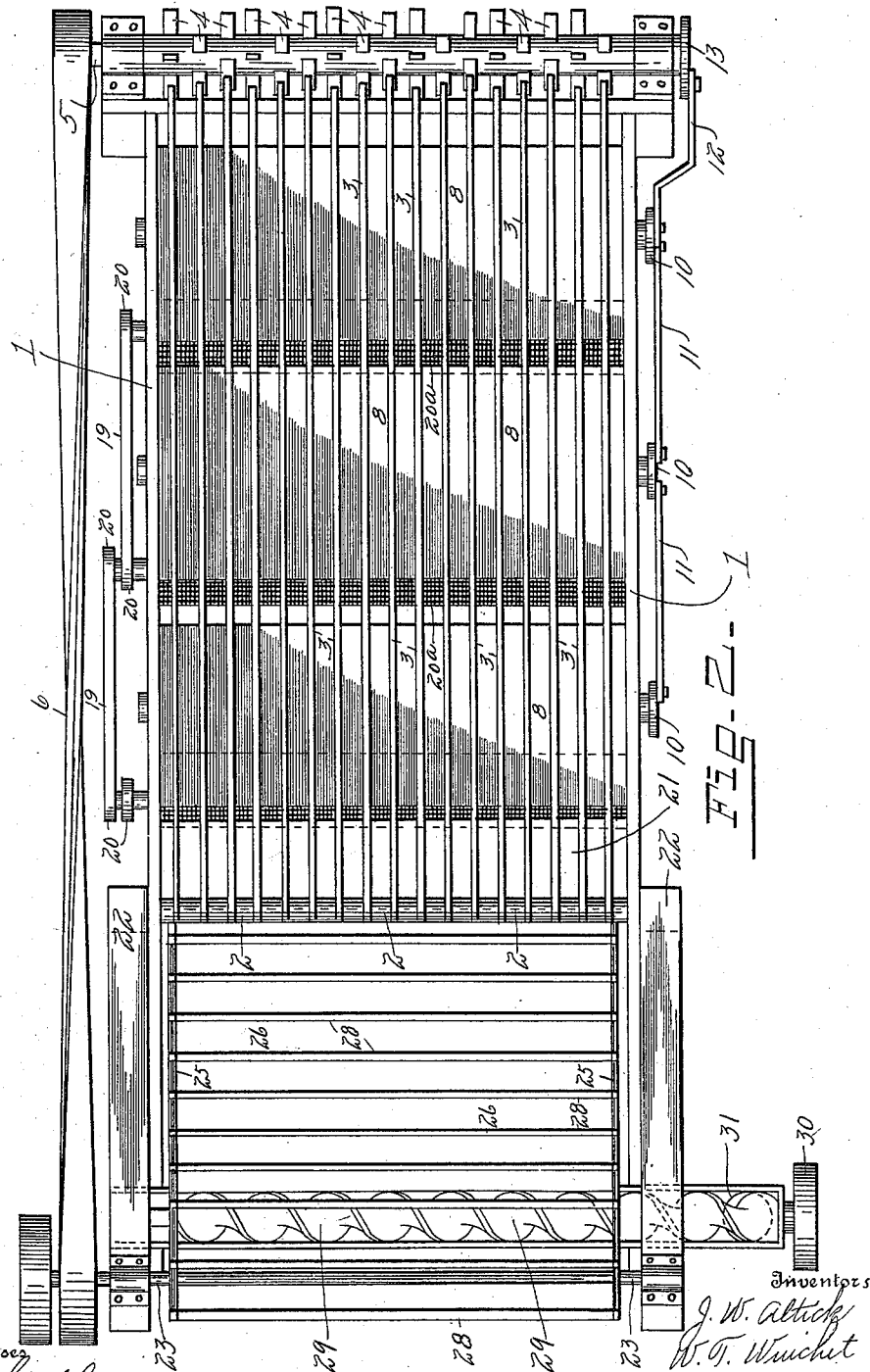

J. W. ALTICK & W. T. WUICHET.
PROCESS FOR REDUCING GARBAGE.
APPLICATION FILED OCT. 11, 1909.

965,271.

Patented July 26, 1910.

4 SHEETS—SHEET 4.

Witnesses

Inventors
J. W. Altick
W. T. Wuichet
By
Attorney

UNITED STATES PATENT OFFICE.

JAMES W. ALTICK AND WILLIAM T. WUICHET, OF DAYTON, OHIO.

PROCESS FOR REDUCING GARBAGE.

965,271.  Specification of Letters Patent.  Patented July 26, 1910.

Application filed October 11, 1909. Serial No. 522,153.

*To all whom it may concern:*

Be it known that we, JAMES W. ALTICK and WILLIAM T. WUICHET, citizens of the United States, residing at Dayton, in the county of Montgomery and State of Ohio, have invented certain new and useful Improvements in Processes for Reducing Garbage; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in process of reducing garbage preparatory to extracting the grease therefrom for commercial purposes.

The object of the invention is to devise a process which will separate the inorganic matter such as iron, various other metallic substances, crockery, dishes, etc., from the organic matter without the aid of manual labor and to thus expedite the handling of the garbage, and protect and preserve the grinder.

A further object of the invention is to devise a process through which the garbage is reduced to a condition for a thorough extraction of the grease.

Figure 6:
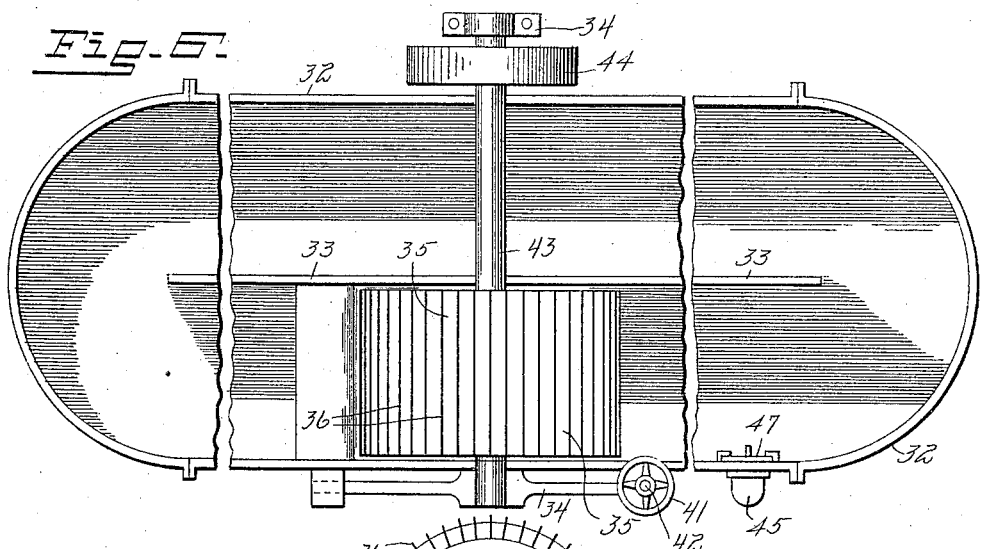
Figure 7:
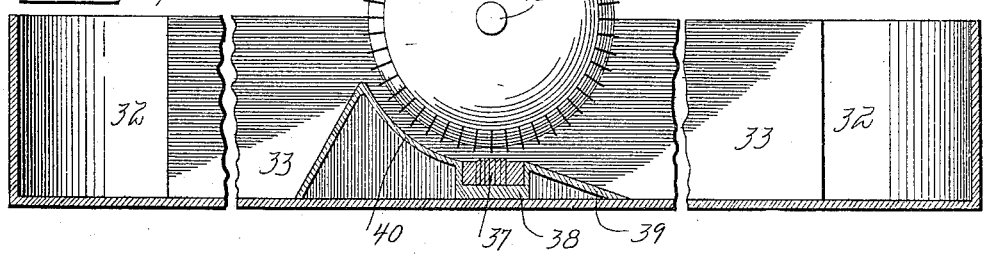
Figure 8:
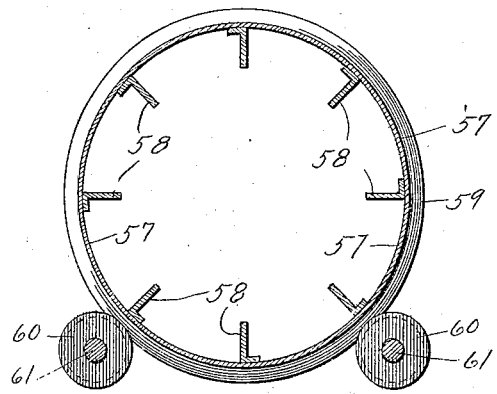

Referring to the accompanying drawings, Figure 1 is a diagrammatic view showing the apparatus as used in the different stages of reducing garbage to pulp and separating the foreign substances such as iron, tin, china, etc., therefrom. Fig. 2 is a top plan view of the separator wherein the foreign substance or substances are separated from the garbage. Fig. 3 is a longitudinal vertical sectional elevation through the separator. Fig. 4 is a sectional view on the line *b—b* of Fig. 3, showing the construction of the elevator drag board. Fig. 5 is a detail view of one of the agitators of the separator. Fig. 6 is a top plan view of the grinder or beater. Fig. 7 is a side elevation of the same with the front side removed. Fig. 8 is a sectional view, enlarged, on the line *a—a* of Fig. 1.

Referring to Figs. 1, 2 and 3, 1 designates a rectangular tank constructed of wood or any suitable material, in which are pivotally mounted at 2, a multiplicity of inclined vibrating bars 3 which are about six inches apart and lie substantially parallel. The outer or upper ends of this series of bars extend above the mouth of the tank and engage a series of cams 4 projecting from a shaft 5. The shaft 5 is driven by a belt 6 from a shaft 23 to be again referred to, and the cams 4 impart to the outer ends of said bars 3 an upward vertical movement, said bars falling by their own weight after being released by the cams and thus subjected to a constant vibration. The garbage or raw material, which contains to a greater or less extent much inorganic foreign substances such as crockery, scraps of iron, tin cans, etc., is raked off a platform onto a grid formed of the bar 3, and the continuous rocking or vibratory movement of said bars will separate the organic material, which will fall through openings between the bars onto a suitable number of rocking or tilting tables 8. These tables 8 are mounted on shafts 9 which have bearings in the sides of the tank 1, said shafts having on their outer ends disks 10 which are connected by links 11. The shafts 9 and the tables 8 are rocked by means of a connecting rod 12 which is joined at one end to one of said disks 10 and to a disk 13 on the shaft 5 before referred to as the shaft which carries the cams 4. The rotation of the shaft 5 will rock the tables 8 through the connection just described.

In carrying out our improved process of reducing garbage, the garbage proper or raw material is first separated from the inorganic foreign substances in a tank of water; secondly, the garbage proper or raw material is agitated after its separation, said agitation taking place in water; thirdly, the pulp is separated from the excessive water, and fourthly, the pulp is brought to a complete state of dryness. The first stage or step in the process takes place in the separator which is now being described. The tank 1 is filled with water, the level thereof being regulated by an overflow pipe 14, said water being utilized as a vehicle for the garbage which has more or less tendency to float. When the garbage falls upon the tables 8, it slides by gravity off one onto another, and the rocking movement of said tables augments the floating action of the garbage and prevents the same from falling between the tables 8. Whenever any inorganic or foreign matter such as hereinbefore indicated, falls on said tables, it slides off to the bottom of the tank where it may accumulate and be removed through the door 15 (see Fig. 3). In order to prevent the possibility of any garbage or organic matter which it is desired to retain, falling between the tables and becoming lost, agitators are mounted under and between the tables 8 which further augment the floating action of the garbage by churning the liquid and thus prevents the heavier parts of the same from sinking.

As shown in Figs. 3 and 5, the agitators referred to consist of cross bars 16 attached to spiders 17 mounted on shafts 18 journaled in the sides of the separator tank 1. On their outer ends the shafts 18 are provided with pulleys 20 driven by belts 19 (see Fig. 2) and by means of which said agitators are rotated. These agitators rotate at high speed and above the same are mounted semicircular shields 20$^a$ of perforated metal or wire mesh which serve to prevent the heavy foreign matter from injuring the slats or cross bars of the agitators. Notwithstanding the garbage has a slight tendency to float, its specific gravity is slightly heavier than water and will therefore gradually sink; owing, however, to the fact that the tables 8 form an incline, the garbage will gradually work down until it rests upon a plate 21, located at the bottom forward end of the tank below the pivots 2 of the bars 3. From this position the garbage is removed from the tank through means of a chain elevator which will now be described. At one end of the separator tank 1 are frames 22 on which is journaled a shaft 23 provided with sprocket wheels 24. Passing around said sprocket wheels are chains 25 which also pass downward into the tank in proximity to the plate 21, and around a drag board 26 attached to the sides of the tank. The said drag board is mounted at an angle and the edges thereof are provided with metallic straps 27 as shown in Fig. 4; the chains 25 travel upon these straps, which are curved at their lower ends to provide bearings for the chains. Extending across the drag board 26, and attached to the sprocket chains 25, is a plurality of slats 28 that engage the garbage accumulated on the plate 21, and carry the same upwardly along the drag board and deposit it in a spiral conveyer 29. The conveyer 29 is mounted upon the frames 22 and extends over the edge of the tank 1 as shown in Fig. 2, where it is provided with a pulley 30 by which it is driven; said conveyer is also provided with a chute 31 through which the garbage may fall to the grinder or beater where the second step in the process takes place.

The grinder or beater is shown in enlarged proportions in Figs. 6 and 7. In Fig. 1 it is shown adjacent to the tank 1 in which the first step in the process takes place as described. It is highly desirable that no inorganic matter shall enter the grinder. The separator is mounted on the upper floor of the building, preferably, and the grinder or beater is placed on the next lower floor. After the garbage leaves the separator, through the chute 31, it contains more or less solid matter, such as large pieces of discarded food products, corn cobs and the like, which must be broken up into fine particles in order to be completely dried preparatory to being acted upon by the naphtha, during the extraction of the grease. The grinder consists of an oblong tank 32 of suitable proportions and curved at each end. Extending longitudinally in its center is a division wall 33 which does not extend clear to the ends of the tank and which forms a race in which the garbage travels. On one side of the tank 32, and supported in bearings 34, is a beater roll 35 the periphery of which is provided with knives or cutter bars 36 which coöperate with stationary knives 37 arranged at the bottom of the beater roll in a frame 38; these knives coöperating, grind the garbage. Extending from the frame 38 in one direction is an incline 39, and in the other direction a circular plate 40. The incline 39 prevents any foreign matter that might by any possibility pass from the separator, from entering the space between the cutter bars 36 and the knives 37 and thereby avoids damage to said knives. The distance between the cutter bars 36 and the knives 37 is adjusted by a hand wheel 41 which engages a threaded stem 42 attached to one of the bearings 34. The beater roll 35 is mounted upon a shaft 43 and is rotated by means of a pulley 44. During the rotation of said beater roll the garbage held in suspension, having previously been mixed with a sufficient quantity of water, passes between the cutter bars 36 and the knives 37 and is thoroughly disintegrated. The garbage and the water in which it is suspended, are drawn off through a chute 45 leading from an opening 46 in the side of the beater tank and which opening is controlled by a slide valve 47. The opening 46 is preferably located some distance above the bottom of the beater, as it is not desirable to draw off all the fluid, which would prevent the beater from being easily started. The chute 45 leads to a separating or settling tank 48 located below the beater and provided with an outlet 49 controlled by a valve 50, through which the surplus water is drawn off. The tank 48 is also provided with an outlet 51 controlled by a gate 52 located on the side of the tank and through which the pulp is withdrawn to a storage tank 53 located below the separating or settling tank 48. The storage tank 53 is provided with a false bottom 54 which leads to a trough 55, located at one end thereof, said tank is also provided with a gate 56 which controls the passage of the pulp to the drier which will now be described. The drier consists of a metal cylinder 57 on the interior of which is arranged a plurality of vanes 58 and on the exterior of which two rings 59 are placed, which are provided with bearings on flange wheels 60 mounted on shafts 61. The shafts 61 are journaled in bearings 62 and are provided with a sprocket or pulley 63 by which said shafts are rotated to revolve the drying cylinder 57. A furnace 64 is located at one end of the drying cylinder, said furnace having a flue 65 which communicates with the interior of said cylinder. At the end at which the flue 65 is placed is located a guide or chute 66 which leads the pulp from the storage tank to the interior of the drier. At the other end of the cylinder is placed a spiral conveyer 67 which carries the dried pulp away from the drier and thus the process is completed. A stack conducts the evaporated water from the pulp as well as the products of combustion from the furnace.

When the gate 56 of the storage tank 53 is opened, the pulp will fall into the chute 66 and will be guided into the interior of the drier 57, where it will be turned over and over by the revolving vane 58 of the rotating drier; meanwhile being exposed to the hot gases from the furnace 64. As hereinbefore stated, the pulp when introduced to the drier is in very fine particles, which is due to its being ground in the beater, therefore the drying will be quick and effective. The forward or stack end of the drier is placed slightly lower than the furnace end, the vanes 58 will therefore work the pulp toward the stack end, where it will fall into the conveyer 67 to be carried to a storage bin or to the percolators where the grease is extracted. The storage bin or percolators need not be further referred to nor are they shown in the drawings, as they constitute no part of the process or apparatus.

Having described our invention, we claim:

1. The herein described process of treating garbage for commercial purposes, which consists in beating the organic and inorganic matter in water to separate the same, and in further agitating the water below the beaters to assist the separation, and in finally grinding the organic matter thus separated and disintegrated in water.

2. The herein described process of treating garbage for commercial purposes, which consists in agitating, beating and separating in water the organic and inorganic matter, in further agitating the organic and inorganic matter in the water to assist the separation, and in grinding the organic matter after its removal from the water, substantially as specified.

3. The herein described process of treating garbage for commercial purposes, consisting first in beating the organic and inorganic matter in a body of water to separate the same, secondly, in further agitating the water below the beaters to assist the separation, thirdly, in grinding the organic matter into pulp, and fourthly, in separating the pulp from any excess of liquid, substantially as specified.

In testimony whereof we affix our signatures, in presence of two witnesses.

JAMES W. ALTICK.
WILLIAM T. WUICHET.

Witnesses:
R. J. McCarty,
Matthew Siebler.